United States Patent [19]

Lee et al.

[11] Patent Number: 5,438,660
[45] Date of Patent: Aug. 1, 1995

[54] METHOD AND APPARATUS FOR INPUTTING ELECTRONIC MAIL

[75] Inventors: Raymond E. Lee, Irving; Robert J. Torres, Colleyville, both of Tex.

[73] Assignee: International Business Machines Corporation, Armonk, N.Y.

[21] Appl. No.: 340,006

[22] Filed: Nov. 15, 1994

Related U.S. Application Data

[63] Continuation of Ser. No. 860,327, Mar. 30, 1992, abandoned.

[51] Int. Cl.6 .............................................. G06F 15/60
[52] U.S. Cl. ...................................... 395/155; 395/161
[58] Field of Search ................ 395/155, 157, 158–160, 395/161, 146–149

[56] References Cited

U.S. PATENT DOCUMENTS

| | | | |
|---|---|---|---|
| 4,555,775 | 11/1985 | Pike | 395/157 |
| 4,574,364 | 3/1986 | Tabata et al. | 395/157 |
| 4,642,790 | 2/1987 | Minshull et al. | 395/157 |
| 4,688,167 | 8/1987 | Agarwal | 395/157 |
| 5,091,866 | 2/1992 | Takagi | 395/158 |

OTHER PUBLICATIONS

S. S. Fleming, "Graphical Access to Calendar Displays" IBM Technical Disclosure Bulletin, vol. 34, No. 2, pp. 483–484, published Jul., 1991 at Armonk, N.Y.

*Primary Examiner*—Mark R. Powell
*Assistant Examiner*—Huynh Ba
*Attorney, Agent, or Firm*—Norman L. Gundel

[57] ABSTRACT

A method and apparatus of the alternately displaying two separate data entry views of an electronic mail object. A first data entry view graphically displays a visual metaphor of at least one sheet of note paper partially overlying an envelope, with only a portion of the envelope visible in the display. A second data entry view graphically displays a visual metaphor of an envelope overlying a portion of at least one sheet of note paper, with only a portion of the sheet of note paper visible in the display. In either view, the overlying displayed sheet of note paper or envelope is active for the entry of message text or destination information, respectively, while the partially displayed envelope or sheet of note paper is inactive to such data entry. Instead, the selection with a pointing device of the partially obscured envelope or sheet of note paper causes that selected envelope or sheet of note paper to be fully displayed and rendered active for data entry while rendering inactive and partially obscuring the previously active field.

14 Claims, 5 Drawing Sheets

METHOD AND APPARATUS FOR INPUTTING ELECTRONIC MAIL

The application is a continuation of commonly owned application Ser. No. 07/860,327, filed Mar. 30, 1992 and now abandoned.

BACKGROUND OF THE INVENTION

1. Field of the Invention

The present invention relates in general to electronic mail and in particular to an electronic mail system that allows a user to repeatedly switch, with a single action, between a message text data entry view and a destination information data entry view of an electronic mail object.

2. Description of the Related Art

A data processing system may include an electronic mail system. An electronic mail system typically allows a person, called a user, who is operating a single computer or work station of the data processing system, to create and send an electronic mail object to a second user, who is operating a different computer or work station of the data processing system. The first user may enter both message text, which forms the content of an electronic mail object, and also destination information, which provides the electronic address for the forwarding of the electronic mail object by the data processing system.

Upon the opening of an electronic mail object, an electronic mail system may display a single data entry view for entry of both message text and destination information. The single data entry view may include separate fields for the message text and for the destination information. However, the simultaneous display of both message text and destination information in a single view limits the amount of each type of information that may be displayed in the view.

Alternatively, an electronic mail system may display and allow the entry of message text in one data entry view and subsequently display and allow the entry of destination information in a separate data entry view that is displayed after the completion of the message text entry and upon initiation of the send process. Although the provision of separate data entry views allows greater amounts of either message text or destination information to be displayed at one time, it can be awkward to leave the send process and return to the message text data entry view from the destination information data entry view that is displayed during the send process.

SUMMARY OF THE INVENTION

The method and apparatus of the present invention alternately display two separate data entry views of an electronic mail object. A first data entry view graphically displays a visual metaphor of at least one sheet of note paper partially overlying an envelope, with only a portion of the envelope visible in the display. A second data entry view graphically displays a visual metaphor of an envelope overlying a portion of at least one sheet of note paper, with only a portion of the sheet of note paper visible in the display. In either view, the overlying displayed sheet of note paper or envelope is active for the entry of message text or destination information, respectively, while the partially displayed envelope or sheet of note paper is inactive to such data entry. Instead, the selection with a pointing device of the partially obscured envelope or sheet of note paper causes that selected envelope or sheet of note paper to be fully displayed and rendered active for data entry while rendering inactive and partially obscuring the previously active field.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
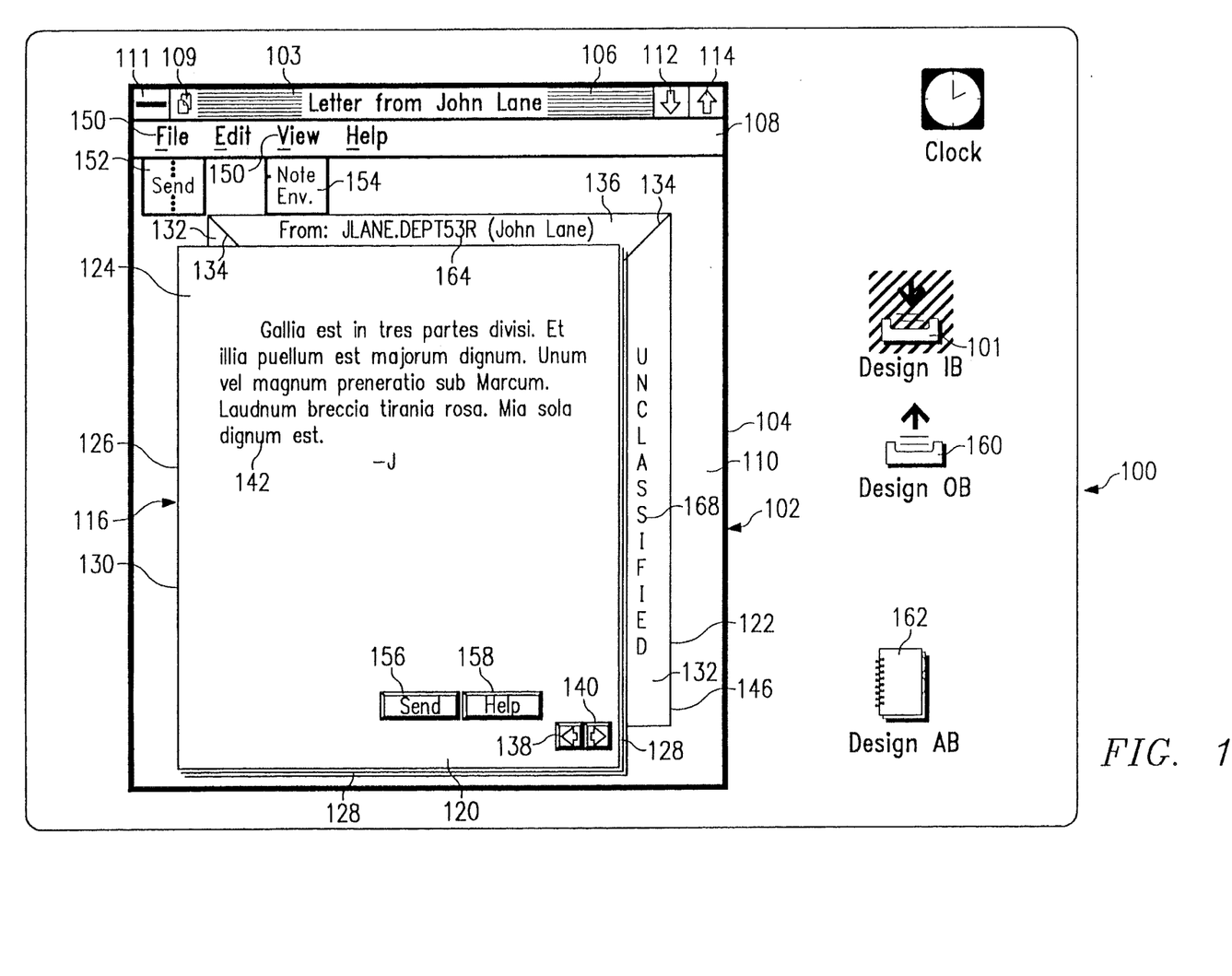
FIG. 1 depicts a pictorial representation of a message text data entry view of an electronic mail object, displayed within a window in the workplace on a computer display screen.
Figure 2:
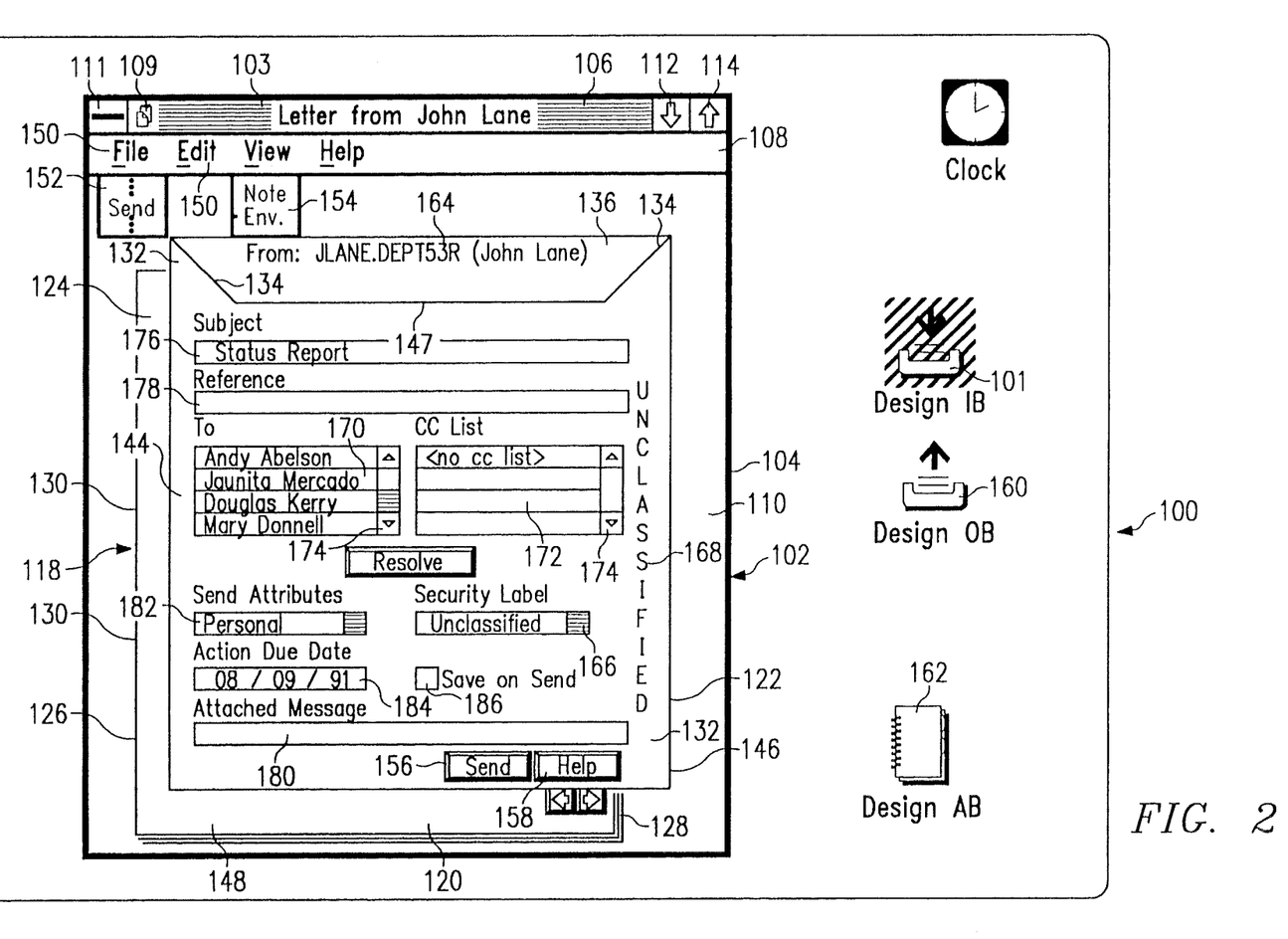
FIG. 2 depicts a pictorial representation of a destination information data entry view of an electronic mail object, displayed within a window in the workplace on a computer display screen.

With reference now to the Figures, and in particular with reference to FIGS. 1 and 2, a workplace 100 is shown on a display screen of a data processing system that includes an electronic mail system. A window 102 is shown in the workplace 100. FIGS. 1 and 2 show, within the window 102, alternate views 116 and 118, respectively, of an electronic mail object.

An electronic mail object may be transmitted between persons who are users of the data processing system. A user called a sender may send an electronic mail object to one or more other users called recipients.

An electronic mail object ordinarily contains both message text and destination information. The message text is the information or data that the sender is conveying to the recipient; it is the part of the message of concern to the recipient. The message text may include alphanumeric sentences or paragraphs or tabular or graphical data. Message text may be input into the electronic mail object directly from a keyboard by the sender, as with an editor, or it may reside in an electronic mail object received from another user or it may be copied into the electronic mail object from other electronic mail objects or from other data objects residing in or available to the data processing system.

An electronic mail object must also include destination information before the object can be sent. Destination information allows the data processing system to ascertain an electronic address for the delivery of the electronic mail object by the data processing system. Destination information may be entered into the electronic mail object by direct entry of an electronic address or a nickname or by designation of a distribution list. Destination information may also be provided by the data processing system in response to the sender's selection of an option, such as the option of replying to an electronic mail object received from another user.

The electronic mail object may be newly created or, as shown in FIGS. 1 and 2, it may have been retrieved from an in-basket 101. The electronic mail object is displayed in the window 102 shown in FIGS. 1 and 2. The window 102 is displayed in the workplace 100 in a manner well known to those skilled in the art, using a graphical operating system such as the preferred IBM OS/2 Presentation Manager. The window 102 includes a window border 104, a title bar 106, a menu bar 108 and a client area 110.

Title bar 106 includes, in addition to the window title 103 of the window 102, a system menu symbol 111, a small icon 109 and sizing buttons 112 and 114. The system menu symbol 111 provides a pull-down menu that contains choices that affect the window and other operating-environment-specific functions. Small icon 109 is an icon for the electronic mail object that is displayed in the window 102. Small icon 109 can be directly manipulated. Window sizing button 112 provides an action choice that minimizes the window 102 by reducing it to an icon. Conversely, window-sizing button 114 provides an action choice that maximizes the window 102 by enlarging it to its largest possible size, or, if the window is maximized, restores the window to the size it was and the position it was before it was maximized.

Menu bar 108 contains routing choices 150 that display pull-down menus such as menus 152 and 154. Ordinarily only one such pull-down menu may be displayed at any given time; however, for purposes of illustration, FIGS. 1 and 2 simultaneously display both a portion of the file pull-down menu 152 and the view pull-down menu 154 to illustrate the choices provided there. The view pull-down menu 154 includes a "note" choice and an "envelope" choice, which appears as "env." in the drawings. The file pull-down menu 152 includes a "send" choice. A "send" choice may also be entered by selecting a "send" push button 156. Similarly, a "help" function may be initiated either by selecting a "help" routing choice from the menu bar 108 or by selecting a "help" push button 158.

The client area 110 comprises the remainder of window 102. Client area 110 is the focus of the user's attention and it is where the user is alternately presented with a message text data entry view 116 of the electronic mail object, as shown in FIG. 1, and a destination information data entry view 118 of the electronic mail object, as shown in FIG. 2. Both views present the visual metaphor of a stack of sheets of note paper 130 and an envelope 122. In the message text data entry view 116 shown in FIG. 1, the visual metaphor is of the stack of sheets of note paper 130 lying on top of and partially obscuring the envelope 122 so that the uppermost sheet of note paper 120 may be written upon. In the destination information data entry view 118 shown in FIG. 2, the visual metaphor is of the mailing envelope 122 lying on top of and partially obscuring the stack of sheets of note paper 130 so that the envelope 122 may be addressed.

The message text data entry view 116 shown in FIG. 1 includes a rectangular data entry field 124 surrounded by a visible border 126. The visible border 126 includes multiple parallel lines 128 along two adjacent edges of the rectangular data entry field 124, to suggest the edges of multiple sheets of note paper forming the stack of sheets of note paper 130. The rectangular data entry field 124 is also bounded along two edges, outside the visible border 126, by an "L" shaped selection field or hot area 132. This selection field 132 is displayed with diagonal lines 134 in the upper corners thereof to suggest a portion of the visual metaphor of a flap 136 of the envelope 122, as shown in FIG. 2. In the message text data entry view 116 shown in FIG. 1, the "L" shaped selection field 132 presents the visual metaphor of only a portion of the envelope 122, the remainder of which envelope 122 is covered and obscured by the overlying rectangular data entry field 124 that presents the visual metaphor of a stack of sheets of note paper 130. Thus, the overall visual metaphor of the message text data entry view 116 shown in FIG. 1 is a stack of sheets of note paper 130 overlying and partially obscuring an envelope 122.

In the message text data entry view shown in FIG. 1, the rectangular data entry field 124 is active for text entry. The field 124 will accept entry of message text 142 from a keyboard, using an editor, as well as from other files or objects which may be resident in or available to the data processing system.

Text or other data entered into the rectangular data entry field 124 is displayed in that field and forms the message text 142 of the electronic mail object. Preferably, the editor will permit continuous text entry, scrolling up and down as needed to accommodate the text input. Additionally, the message text data entry view 116 is provided with push buttons 138 and 140, which provide action choices for paging backward and forward through multiple page message text. Optionally, the number of parallel lines 128, which suggest the edges of multiple sheets of note paper, may be varied in proportion to the length of the message text 142 to suggest the number of pages of message text 142.

The "L" shaped selection field 132 displayed in the message text data entry view 116 as a portion of the envelope 130 provides an action choice. Selection, as with a pointing device, of the "L" shaped selection field 132 causes the destination information data entry view 118 of the electronic mail object to replace the message text data entry view 116 in the window 102 in the workplace 100.

The electronic mail object may be sent from the message text data entry view 116 either by selecting the "send" choice from the File pull-down menu 152 or by selecting the "send" push-button 156. The electronic mail object may also be sent by dragging and dropping the small icon 109 on an out-basket 160 in the workplace 100. However, an electronic mail system typically will not send an electronic mail object if the object lacks required destination information or contains erroneous destination information. Instead, an electronic mail system will typically respond to the "send" choice by displaying the object's inadequate or erroneous destination information. In accordance with the present invention, the destination information data entry view 118 of the electronic mail object will be displayed in the window 102.

FIG. 2 shows the destination information data entry view 118 of the electronic mail object. This view 118 is displayed in response to the user's selection of the "L" shaped selection field 132 in the message text data entry view 116. This view 118 is also displayed in response to an attempt to send an electronic mail object that contains inadequate or erroneous destination information. The inadequately addressed electronic mail object need not be an object in an open window 102; if an electronic mail object is minimized when dropped on the out-basket 160, the electronic mail system will first open a window 102 and then display the destination information data entry view 118 of the electronic mail object in the newly opened window 102.

In the destination information data entry view 118, a rectangular data entry field 144 is active for the input of destination information and selection of choices. The rectangular data entry field 144 is bounded by a visible border 146 which, together with the diagonal lines 134 and a horizontal line 147, present the visual metaphor of the envelope 122, in which diagonal lines 134 and horizontal line 147 suggest the flap 136.

The rectangular data entry field 144 is bounded along two edges by an "L" shaped selection field or hot area 148. This selection field 148 of FIG. 2 provides an action choice in the same manner as selection field 132, shown in FIG. 1 and described above. The destination information data entry view 118 presents the visual metaphor of a stack of sheets of note paper 130, including a portion of the visible border 126 that displays multiple parallel lines 128 along two adjacent edges. In the destination information data entry view 118 shown in FIG. 2, the stack of sheets of note paper 130 is depicted as lying beneath the envelope 122; thus only a portion of the stack of sheets of note paper 130 is visible in the destination information data entry view 118, the remainder appearing to be obscured by the envelope 122 that appears to overlie it.

In the destination information data entry view 118 shown in FIG. 2, selection of the selection field 148, as with a pointing device, causes the message text data entry view 116 to replace the destination information data entry view 118 in the window 102 in the workplace 100.

In the destination information data entry view 118, the rectangular data entry field 144, which presents the visual metaphor of envelope 122, is active for data entry and the selection of various alternatives that may optionally be displayed therein. Destination information may be input by the sender, as through a keyboard, or, as in the case of a stored electronic mail object or one received from another user, pre-existing destination information 164 may be displayed in the rectangular data entry field 144. The rectangular data entry field 144 may also have provisions for the selection or display of attributes such as the selection 166 and display 168 of a security classification or a request for confirmation of delivery. Addressee fields 170 and copy recipient fields 172 may be provided; these fields may be provided with vertical scroll bars 174 to permit the entry or selection of a larger number of addressees, copy recipients or distribution lists than may be displayed without scrolling. Addressees and copy recipients may be selected from an address book 162. A Subject data entry field 176 and a Reference data entry field 178 may be provided. An Attached Message data entry field 180 may be provided to permit a separate message to be sent concurrently with the sending of the electronic mail object. A send attributes field 182 may allow the selection of message attributes and an action due date field 184 may permit an interaction with an electronic calendaring application, as, for example, posting or revising an action due date that may be linked to the electronic calendar application. A save on send choice 186 may be offered.

Preferably, the stack of sheets of note paper 130 is displayed at the same location in the window 102 in the workplace 100 in both the message text data entry view 116 and the destination information data entry view 118. Similarly, preferably, the envelope 122 is displayed in the same location in the window 102 in the workplace 100 in the message text data entry view 116 and the destination information data entry view 118. The two views differ in that, in the message text data entry view 116, the stack of sheets of note paper 130 is shown as overlying and partially obscuring the envelope 122, while in the destination information data entry view 118, the envelope 122 is shown as overlying and partially obscuring the stack of sheets of note paper 130.

Figure 3:
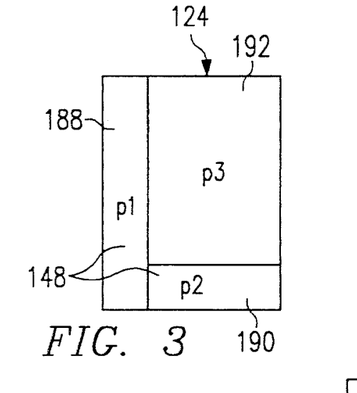
FIG. 3 depicts the division into panels of the rectangular data entry field shown in FIG. 1.
Figure 4:
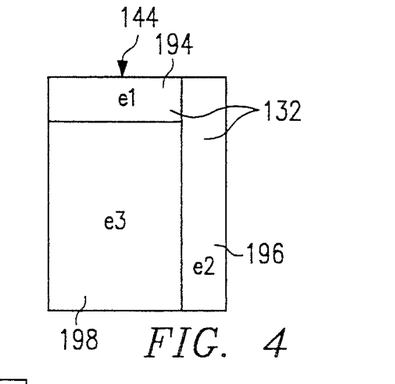
FIG. 4 depicts the division into panels of the rectangular data entry field shown in FIG. 2.
Figure 5:
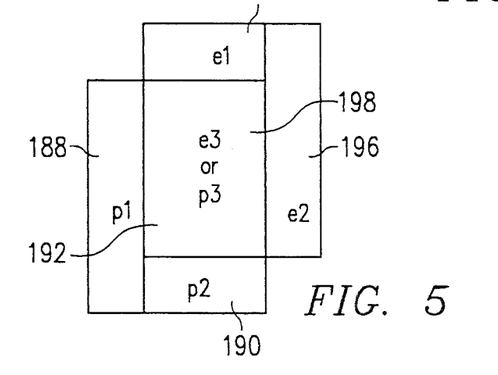
FIG. 5 depicts the overlapping of the panels shown in FIG. 3 and 4 in the views of the electronic mail object shown in FIGS. 1 and 2.

Turning now to FIGS. 3, 4, and 5, it may be seen that each of the stack of sheets of note paper 130 and the envelope 122 may be composed of three separate panels. With reference to FIG. 3, it may be seen that the rectangular data entry field 124 which forms the visual metaphor for the stack of sheets of note paper 130 may be formed of three separate rectangular panels 188, 190, and 192, which are labeled p1, p2, and p3, respectively, in FIG. 3. In the message text data entry view 116 shown in FIG. 1, all three panels 188, 190, and 192 may be unified to provide the single rectangular data entry field 124. However, in the destination information data entry view 118 shown in FIG. 2, rectangular panels 188 and 190 may together form the "L" shaped selection field 148. Although displayed on the screen as a single field 148, panels 188 and 190 may be defined as separate panels, and the selection of either panel 188 or panel 190 while in the destination information data entry view 118 will cause the display of the message text data entry view 116 in window 102.

Similarly, turning to FIG. 4, it can be seen that the rectangular data entry field 144 shown in FIG. 2, although displayed as a single field, may also be composed of three separate rectangular panels 194, 196 and 198, labeled e1, e2, and e3, respectively, in FIG. 4. While in the destination information data entry view 118, all three of rectangular panels 194, 196 and 198 may form the single rectangular data entry field 144 which is displayed as a visual metaphor for the envelope 122. However, while in the message text data entry view 116, the portion of the envelope 122 represented by panel 198 is obscured by the overlying rectangular data entry field 124, and panels 194 and 196 may together form the "L" shaped selection field 132. As with panels 188 and 190 described above, a selection of either panel 194 or 196, as with a pointing device, while in the message text data entry view 116 will cause the display of destination information data entry view 118 in window 102.

Turning next to FIG. 5, it may be seen that, when the panels 188, 190, 192, 194, 196 and 198 depicted in FIGS. 3 and 4 are overlapped, panels 192 and 198 preferably occupy the same screen position within the window 102. In the message text data entry view 116, panel 192 appears to overlie and obscure panel 198. Conversely, in the destination information data entry view 118, panel 198 appears to overlie and obscure panel 192.

Preferably, all of panels 188, 190, 192, 194, 196 and 198 are non-movable and non-resizable within the window 102. Alternatively, panels 188, 190, 192, 194, 196 and 198 may preferably be moved or resized within the window 102 in unison.

Figure 6:
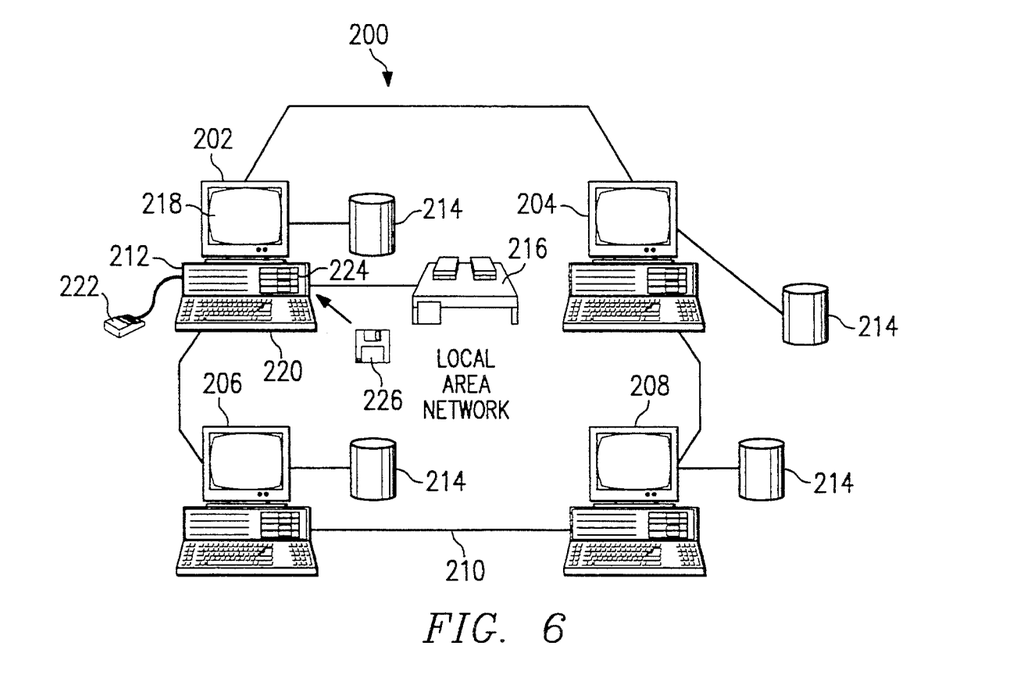
FIG. 6 depicts a pictorial representation of a data processing system which may be utilized to implement the method and apparatus of the present invention.

Referring now to FIG. 6, there is shown a pictorial representation of a data processing system 200 which, when equipped with an electronic mail system, may be used to implement the method and apparatus of the present invention. As may be seen, data processing system 200 may include a plurality of individual computers 202, 204, 206 and 208, which may be connected together to form a local area network 210. Alternatively, a plurality of intelligent workstations coupled to a host processor may be utilized to implement such network.

As is common in data processing systems, each individual computer or workstation, such as computer 202, may include a processor 212 which may include computer readable media such as random access memory and read only memory. Computer 202 may also be coupled to or include a storage device 214 and a printer/output device 216. One or more computer readable media such as storage devices 214 may be utilized to store various data objects such as files or software applications, which may be periodically accessed and processed by a person, called a user, operating computer 202.

Computer 202 may also be provided with a display screen 218, a keyboard 220, a pointing device for selecting, such as a mouse 222, and a drive 224 for computer readable removable media such as a magnetic disk 226 or an optical disk. Such computer readable removable media may be used as distribution media for a software implementation of the method and apparatus of the present invention which includes computer readable instructions. Such software implementation may be stored on or executed from the computer readable media accessible by computer 202, including such memory, storage devices and distribution media. A user operating computer 202 with access to such media may use the present invention to create and send an electronic mail object to another user operating, for example, computer 204.

Figure 7A:
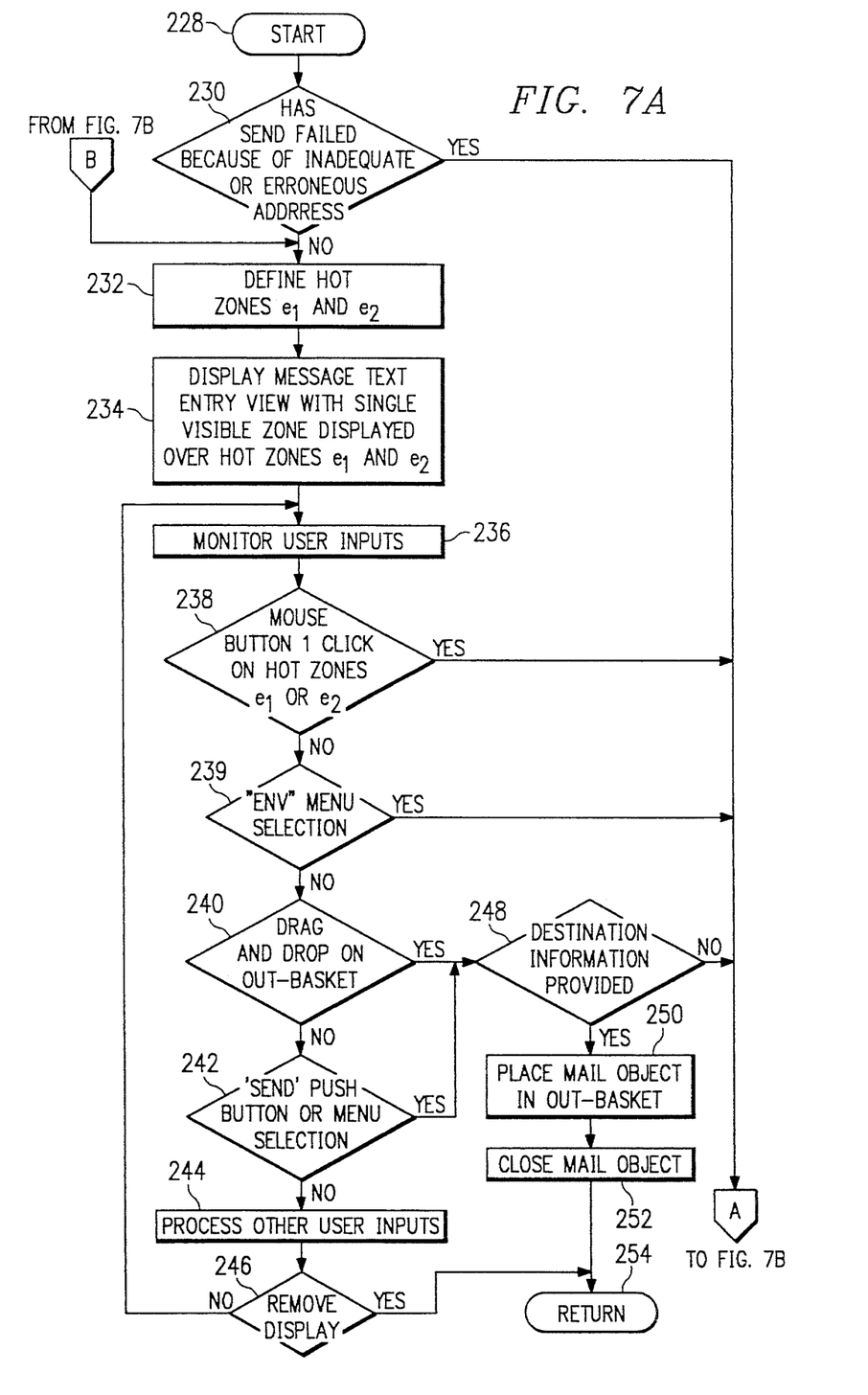
FIGS. 7A and 7B are a flowchart representative of computer operations that embody the improved electronic mail input operation of the present invention.
Figure 7B:
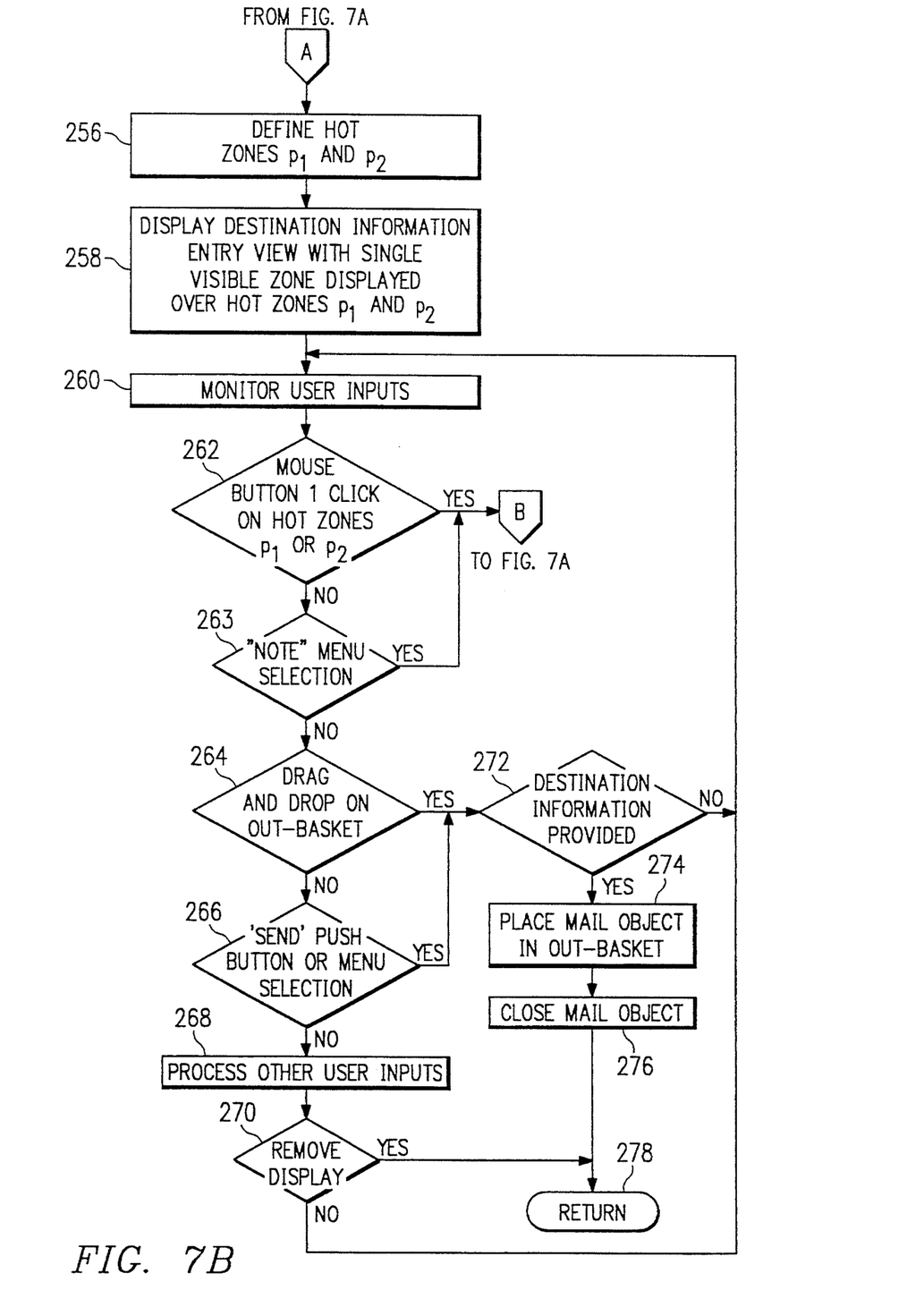

Referring now to FIGS. 7A and 7B, there is shown a flowchart of a preferred software implementation of the method and apparatus of the present invention. The implementation commences, after the system has been initialized, at block 228 in FIG. 7A in response to user input. Such input can include the creation of a new electronic mail object, the opening of an electronic mail object contained within in-basket 101 or an attempt to drag and drop an inadequately addressed electronic mail object on the out-basket 160.

The process proceeds from block 228 to block 230, where it is determined whether the process was initiated by the electronic mail system in response to a request to send an inadequately addressed electronic mail object. If yes, the process proceeds from block 230 to block 256, described below and illustrated in FIG. 7B. If no, the process proceeds from block 230 to block 232, in which the system defines hot zones e1 and e2, as shown in FIGS. 4 and 5. The process next proceeds to block 234 and displays the message text data entry view 116 of the electronic mail object. A single visible selection field 132 as shown in FIG. 1 is displayed over the two hot zones e1 and e2 shown in FIGS. 4 and 5 in the message text data entry view 116.

The process next proceeds to block 236 and monitors user inputs. When a user input is detected, the process proceeds to block 238 for a determination of whether the user input is mouse button one click on either of hot zones e1 or e2. If yes, the process proceeds to block 256, which is described below and illustrated in FIG. 7B. If no, the process proceeds from block 238 to block 239 for a determination of whether the input is the selection of the "env." action choice from the view pull down menu 154. If yes, the process proceeds from block 239 to block 256. If no, the process proceeds from block 239 to block 240 for a determination of whether the user input is a drag and drop of the small icon 109 of window 102 upon the out-basket 160. If no, the process proceeds from block 240 to block 242 for a determination of whether the user input is the selection of either the "send" push-button 156 or the "send" menu choice from menu 152. If no, the process proceeds from block 242 to block 244 and processes the user input detected.

The process next proceeds from block 244 to block 246, in which it is determined whether the user input processed in block 244 requires removal of the message text data entry view 116 from the window 102. An example of an input requiring removal of the view 116 would be the closing of the window 102. If removal of the message text data entry view 116 is required, the process proceeds from block 246 to block 254 and terminates. If removal of the display is not required by the user input processed in block 244, the process proceeds from block 246 to block 236 and monitors user inputs, as described above.

If it is determined in block 240 that the user input is a drag and drop of the small icon 109 on the out-basket 160, the process proceeds from block 240 to block 248. Similarly, in block 242, if it is determined that the user input is the selection of the "send" push-button or the "send" menu choice, the process proceeds from block 242 to block 248. In block 248, it is determined whether the electronic mail object contains destination information sufficient for the routing of the electronic mail object. If the destination information is incomplete or contains an error, such as addressing a non-existing electronic address, the process proceeds from block 248 to block 256, which is described below and illustrated in FIG. 7B. However, if the destination information provided is sufficient for the routing of the electronic mail object and contains no errors, the process proceeds from block 248 to block 250, in which the electronic mail object is placed in the out-basket 160. The process next proceeds to block 252 and closes the electronic mail object and removes it from the window 102. Finally, the process proceeds to block 254 and terminates.

Turning now to FIG. 7B, the process has proceeded to block 256 from block 230, block 238 or block 248. In block 256, hot zones p1 and p2 are defined. The process next proceeds to block 258 and displays the destination information data entry view 118, having a single visible selection field 148, as shown in FIG. 2, displayed over the two hot zones p1 and p2 shown in FIGS. 3 and 5.

The process next proceeds from block 258 to block 260 and monitors user input. When a user input is detected, the process proceeds to block 262 for a determination of whether the user input is mouse button one click on either of hot zones p1 or p2. If the determination is yes, the process proceeds from block 262 to block 232, as described above and illustrated in FIG. 7A. If the determination is no, the process proceeds from block 262 to block 263. In block 263, it is determined whether the input is the selection of the "note" action choice from the view pull down menu 254. If yes, the process proceeds from block 263 to block 232. If no, the process proceeds from block 263 to block 264.

In block 264, it is determined whether the user input is a drag and drop of the small icon 109 on the out-basket 160. If no, the process proceeds from block 264 to block 266 for a determination of whether the user input is the selection of the "send" push-button or the "send" menu choice. If no, the process proceeds from block 266 to block 268 and processes the user input.

The process next proceeds from block 268 to block 270, where it is determined whether the user input processed in block 268 requires the removal of the destination information data entry view 118 from window 102. If the determination is no, the process proceeds from block 270 to block 260, as described above, and monitors user input. If the determination in block 270 is that the display must be removed, the process proceeds to block 278 and terminates.

If the determination in block 264 is that the user input is a drag and drop of the small icon 109 on the out-basket 160, the process proceeds from block 264 to block 272. Similarly, if the determination in block 266 is that the user input is the selection of the "send" push-button or the "send" menu choice, the process likewise proceeds from block 266 to block 272.

In block 272, it is determined whether the electronic mail object contains sufficient destination information for the forwarding of the electronic mail object. If insufficient or erroneous destination information is provided, the process proceeds from block 272 to block 260 and continues to monitor user input. However, if sufficient destination information is provided, the process proceeds from block 272 to block 274 and places the electronic mail object in the out-basket. The process next proceeds to block 276 and closes the electronic mail object. Finally, the process proceeds to block 278 and terminates.

Upon reference to the foregoing, it will be appreciated that the applicants have provided a novel and useful method and apparatus for simple and repetitive alteration between a message text data entry view displayed as a visual metaphor of a stack of sheets of note paper overlying an envelope and a destination information data entry view displayed as a visual metaphor of an envelope overlying a stack of sheets of note paper. While the invention has been particularly shown and described with reference to a preferred embodiment, it will be understood that various changes in form and detail may be made therein without departing from the spirit and scope of the invention.

What is claimed is:

1. A method, in a data processing system, said data processing system including a display and means for selecting, of providing a computer user interface for writing, addressing and sending an electronic mail object, the method comprising the steps of:

opening an electronic mail object;

displaying, on the display, a first view of the electronic mail object, said first view including a first rectangular data entry field bounded on two adjacent sides by a first displayed selection field, said first displayed selection field comprising two adjacent, non-overlapping, discrete rectangular selection fields;

accepting entry of electronic mail text or other data input to the first rectangular data entry field;

displaying, in the first rectangular data entry field, at least a portion of the electronic mail text or other data input to the first rectangular data entry field;

in response to a selection of either of the rectangular selection fields of the first displayed selection field, displaying, on the display, a second view of the electronic mail object, said second view including a second rectangular data entry field bounded on two adjacent sides by a second displayed selection field, said second displayed selection field comprising two adjacent, non-overlapping, discrete rectangular selection fields;

accepting entry destination information input to the second rectangular data entry field;

displaying, in the second rectangular data entry field, at least a portion of the destination information input to the second rectangular data entry field;

in response to a selection of either of the rectangular selection fields of the second displayed selection field, re-displaying, on the display, the first view of the electronic mail object;

in response to a failed attempt to send the electronic mail object because of inadequate or erroneous destination information in the second rectangular data entry field of the electronic mail object, displaying, on the display, the second view of the electronic mail object; and in response to a receipt of a send command, transmitting the electronic mail object to a destination identified in the destination information in the second rectangular data entry field.

2. The method of claim 1, wherein the display location of the first rectangular data entry field partially overlaps the display location of the second rectangular data entry field.

3. The method of claim 2, wherein the display location of the first displayed selection field coincides with the display location of that portion of the second rectangular data entry field that is not overlapped by the first rectangular data entry field; and wherein the display location of the second displayed selection field coincides with the display location of that portion of the first rectangular data entry field that is not overlapped by the second rectangular data entry field.

4. A data processing system computer user interface for writing, addressing and sending an electronic mail object, comprising:

means for opening an electronic mail object;

means for displaying a first view of the electronic mail object, said first view including a first rectangular data entry field bounded on two adjacent sides by a first displayed selection field, said first displayed selection field comprising two adjacent, non-overlapping, discrete rectangular selection fields;

means for accepting entry of electronic mail text or other data input to the first rectangular data entry field;

means for displaying, in the first rectangular data entry field, at least a portion of the electronic mail text or other data input to the first rectangular data entry field;

means, responsive to a selection of either of the rectangular selection fields of the first displayed selection field, for displaying a second view of the electronic mail object, said second view including a second rectangular data entry field bounded on two adjacent sides by a second displayed selection field, said second displayed selection field comprising two adjacent, non-overlapping, discrete rectangular selection fields;

means for accepting entry of destination information input to the second rectangular data entry field;

means for displaying, in the second rectangular data entry field, at least a portion of the destination information input to the second rectangular data entry field;

means, responsive to a selection of either of the rectangular selection fields of the second displayed selection field, re-displaying, the first view of the electronic mail object;

means for displaying, on the display, the second view of the electronic mail object, in response to a failed attempt to send the electronic mail object because of inadequate or erroneous destination information in the second rectangular data entry field of the electronic mail object; and means for transmitting the electronic mail object to a destination identified in the destination information in the second rectangular data entry field in response to a receipt of a send command.

5. The data processing system of claim 4, wherein the display location of the first rectangular data entry field partially overlaps the display location of the second rectangular data entry field.

6. The data processing system of claim 5, wherein the display location of the first displayed selection field coincides with the display location of that portion of the second rectangular data entry field that is not overlapped by the first rectangular data entry field; and wherein the display location of the second displayed selection field coincides with the display location of that portion of the first rectangular data entry field that is not overlapped by the second rectangular data entry field.

7. The method of claim 1, wherein the attempt to send the electronic mail object was initiated by dropping the electronic mail object upon an out-basket.

8. The method of claim 1, wherein the attempt to send the electronic mail object was initiated by the selection of a "send" button.

9. The method of claim 1, wherein the attempt to send the electronic mail object was initiated by the selection of a "send" menu selection.

10. The method of claim 1, further comprising the computer implemented step of displaying, on the display, the second view of the electronic mail object, in response to a selection of a choice to display the destination information entry field.

11. The data processing system computer user interface of claim 4, wherein the attempt to send the electronic mail object was initiated by dropping the electronic mail object upon an out-basket.

12. The data processing system computer user interface of claim 4, wherein the attempt to send the electronic mail object was initiated by the selection of a "send" button.

13. The data processing system computer user interface of claim 4, wherein the attempt to send the electronic mail object was initiated by the,selection of a "send" menu selection.

14. The data processing system computer user interface of claim 4, further comprising means for displaying, on the display, the second view of the electronic mail object, in response to a selection of a choice to display the destination information entry field.

* * * * *